US008749475B2

(12) United States Patent
Chen et al.

(10) Patent No.: US 8,749,475 B2
(45) Date of Patent: Jun. 10, 2014

(54) PIXEL ARRAY AND DISPLAY PANEL HAVING THE SAME

(75) Inventors: Szu-Chieh Chen, Miaoli County (TW); Ming-Tien Lin, Hsinchu (TW); Pin-Wei Wu, Changhua County (TW)

(73) Assignee: Au Optronics Corporation, Hsinchu (TW)

( * ) Notice: Subject to any disclaimer, the term of this patent is extended or adjusted under 35 U.S.C. 154(b) by 532 days.

(21) Appl. No.: 12/906,140

(22) Filed: Oct. 18, 2010

(65) Prior Publication Data

US 2011/0310032 A1 Dec. 22, 2011

(30) Foreign Application Priority Data

Jun. 17, 2010 (TW) ................................ 99119674 A

(51) Int. Cl.
*G09G 3/36* (2006.01)
(52) U.S. Cl.
USPC ........................................... 345/104; 349/12
(58) Field of Classification Search
USPC ............ 345/104, 173–178; 349/12, 113–115, 349/155–157; 178/18.01–20.04
See application file for complete search history.

(56) References Cited

U.S. PATENT DOCUMENTS

| 2002/0105508 A1 | 8/2002 | Inada | |
|---|---|---|---|
| 2009/0225047 A1* | 9/2009 | Lee et al. | 345/173 |
| 2010/0194710 A1* | 8/2010 | Koito et al. | 345/174 |

FOREIGN PATENT DOCUMENTS

| JP | 2007011233 | 1/2007 |
|---|---|---|
| TW | 562971 | 11/2003 |
| TW | 200710524 | 3/2007 |

* cited by examiner

*Primary Examiner* — Amr Awad
*Assistant Examiner* — Aaron Midkiff
(74) *Attorney, Agent, or Firm* — Jianq Chyun IP Office

(57) ABSTRACT

A pixel array including a plurality of scan lines and a plurality of data lines disposed crossing the scan lines to define a plurality of sub-pixel regions; at least a controlling structure, disposed in one of the sub-pixel regions and electrically connected to one of the scan lines and data lines; a plurality of sensing signal lines disposed parallel with the data lines and crossing the scan lines to define a plurality of regions having at least one first sub-region and second sub-region; at least one sensing-signal readout device disposed in the first sub-region and electrically connected with one of the scan lines and sensing signal lines; and at least one first sensing pad disposed in the second sub-region and electrically connected to the sensing-signal readout device in the second sub-region. The numbers of the sensing-signal readout devices electrically connected to the respective scan lines are the same.

21 Claims, 4 Drawing Sheets

PIXEL ARRAY AND DISPLAY PANEL HAVING THE SAME

CROSS-REFERENCE TO RELATED APPLICATION

This application claims the priority benefit of Taiwan application serial no. 99119674, filed on Jun. 17, 2010. The entirety of the above-mentioned patent application is hereby incorporated by reference herein and made a part of this specification.

BACKGROUND OF THE INVENTION

1. Field of the Invention

The invention relates generally to a pixel array and a display panel having the pixel array.

2. Description of Related Art

In a typical touch panel, a film layer having a touch function is externally added to a normal display panel. However, the manufacturing process of this type of externally-attached touch panel adds an additional step of assembling the display panel and the touch film layer. Moreover, the touch film layer results in a reduction of the touch panel transmittance and an increase in the touch panel thickness. Therefore, a conventional in-cell type touch panel has been developed to address a need. In the conventional in-cell type resistive touch panel, a plurality of touch structures and photo spacers are formed on an opposite substrate, and a plurality of sensing pads are formed on an active device array substrate corresponding to the touch structures. When a user presses the opposite substrate, the touch structures on the opposite substrate and the sensing pads on the active device array substrate are conducted so as to locate a press location of the user.

In order to output a sensing signal, typically a readout device and two signal lines electrically connected therewith are disposed on the active device array substrate. However, this technique results in a decreased aperture ratio of the display panel. In order to enhance the aperture ratio of the display panel, a technique is electrically connects each of the readout devices with a signal line and a readily available (or namely present/existing) scan line. However, this technique results in an increased loading of the scan line. Moreover, since only a portion of the scan line is electrically connected to the readout device, the loadings of the scan lines in the display panel are not uniform. The overloading and irregular loading issues on the scan lines may lead to problems of abnormal display in the display panel.

SUMMARY OF THE INVENTION

An aspect of the invention provides a pixel array and a display panel having the display array for mitigating the overloading and irregular loading issues in the scan lines of the conventional touch display panel.

A pixel array including a plurality of scan lines and a plurality of data lines disposed crossing the scan lines to define a plurality of sub-pixel regions is provided. At least one controlling structure is disposed in one of the sub-pixel regions and electrically connected to one of the data lines and one of the scan lines. A plurality of sensing signal lines are disposed parallel with the data lines and crossing the scan lines, in which each of the sensing signal lines, the neighboring data line, and the corresponding scan lines define a plurality of regions each having at least one first sub-region and at least one second sub-region. Moreover, at least one sensing-signal readout device is disposed in the first sub-region, in which the sensing-signal readout device is electrically connected to one of the scan lines and one of the sensing signal lines. At least one first sensing pad is disposed in the second sub-region and electrically connected to the sensing-signal readout device in the first sub-region. In particular, the numbers of the sensing-signal readout devices electrically connected to the respective scan lines are the same.

A pixel array including a plurality of pixel structure sets is provided. Each of the pixel structure sets includes a plurality of scan lines and a data line disposed crossing the scan lines to define a plurality of sub-pixel regions. At least one controlling structure is disposed in one of the sub-pixel regions and respectively electrically connected to the data line and one of the scan lines. A sensing signal line is disposed parallel with the data line and crossing the scan lines, in which the sensing signal line, the data line, and the scan lines define a first sub-region and a plurality of second sub-regions. Moreover, at least one sensing-signal readout device is disposed in the first sub-region, in which the sensing-signal readout device is electrically connected to one of the scan lines and the sensing signal line. At least one first sensing pad is disposed in the second sub-region and electrically connected to the sensing-signal readout device in the first sub-region. Particularly, the sensing-signal readout devices in the two pixel structure sets arranged along an extended direction of the scan lines are electrically connected to different scan lines.

Another aspect of the invention provides a display panel, including a first substrate, a second substrate disposed opposite to the first substrate, and a display medium disposed between the first substrate and the second substrate. In particular, the first substrate has the afore-described pixel array.

In the pixel array according to embodiments of the invention, the numbers of the sensing-signal readout devices electrically connected to the respective scan lines are the same. Therefore, the loadings of the scan lines in the pixel array are the same, thereby preventing the issue of overloading on a portion of the scan lines and enhancing the display quality of the display panel.

In order to make the aforementioned and other features and advantages of the invention more comprehensible, embodiments accompanying figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
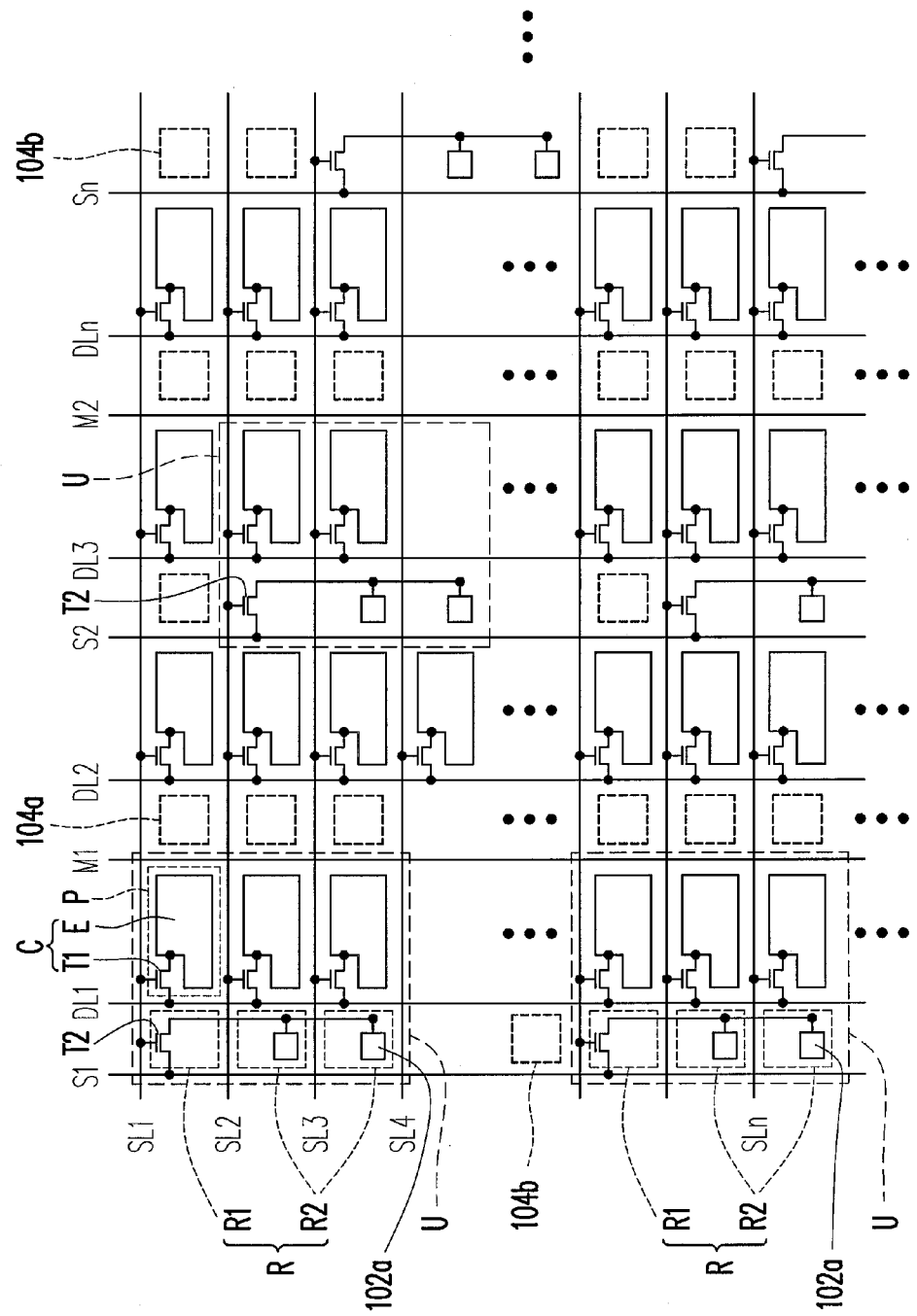
FIG. 1 is a schematic top view of a pixel array according to an embodiment of the invention.

FIG. 1 is a schematic top view of a pixel array according to an embodiment of the invention. Referring to FIG. 1, the pixel array according to the present embodiment includes a plurality of scan lines SL1-SLn, a plurality of data lines DL1-DLn, at least one controlling structure C, a plurality of sensing signal lines S1-Sn, at least one sensing-signal readout device T2, and at least one first sensing pad 102a.

The data lines DL1-DLn are disposed crossing the scan lines SL1-SLn to define a plurality of sub-pixel regions P. More specifically, an extended direction of the data lines DL1-DLn is not parallel with an extended direction of the scan lines SL1-SLn. More preferably, the extended direction of the data lines DL1-DLn is substantially perpendicular to the extended direction of the scan lines SL1-SLn. Moreover, the scan lines SL1-SLn and the data lines DL1-DLn belong to different films. In accordance with conductivity considerations, the scan lines SL1-SLn and the data lines DL1-DLn are typically composed of metallic materials or/and alloy materials. However, the invention is not limited thereto. In other embodiments of the invention, the scan lines SL1-SLn and the data lines DL1-DLn may also be composed of other conductive materials, for example metal oxide, metal nitride, metal oxy-nitride, conductive polymer, other suitable materials, or combinations thereof.

The controlling structures C are respectively disposed in one of the sub-pixel regions P and electrically connected to one of the data lines DL1-DLn and one of the scan lines SL1-SLn. In other embodiments of the invention, when at least two sub-pixel regions P form a pixel region, the controlling structures C may be designed such that the controlling structures C are respectively disposed in one of the two sub-pixel regions P, or disposed in each of the sub-pixel regions P. According to an embodiment of the invention, each of the controlling structures C at least includes an active device T1 and a pixel electrode E. The active device T1 is, for example, a bottom-gate thin film transistor (TFT) including a gate, a semiconductor layer, a source, and a drain. The gate is electrically connected to one of the scan lines SL1-SLn. The semiconductor layer is disposed above the gate, and the source and the drain are disposed above the semiconductor layer. Moreover, the source is electrically connected to one of the data lines DL1-DLn. According to another embodiment, the active device T1 is a top-gate TFT including a gate, a semiconductor layer, a source, and a drain. The gate is electrically connected to one of the scan lines SL1-SLn. The semiconductor layer is disposed below the gate, and the source and the drain are disposed on two sides of the semiconductor layer. Furthermore, the source is electrically connected to one of the data lines DL1-DLn. The pixel electrode E is electrically connected to the active device T1. In the present embodiment, the pixel electrode E is electrically connected to the drain of the TFT T1. The pixel electrode E may be a transmissive pixel electrode, a reflective pixel electrode, or a transflective pixel electrode.

The sensing signal lines S1-Sn are disposed parallel with the data lines DL1-DLn and crossing the scan lines SL1-SLn, and the sensing signal lines S1-Sn and the data lines DL1-DLn are physically different lines. More specifically, an extended direction of the sensing signal lines S1-Sn is substantially parallel with an extended direction of the data lines DL1-DLn, but not parallel with an extended direction of the scan lines SL1-SLn. More preferably, the extended direction of the sensing signal lines S1-Sn is substantially parallel with the extended direction of the data lines DL1-DLn and is substantially perpendicular to the extended direction of the scan lines SL1-SLn. Moreover, the sensing signal lines S1-Sn and the data lines DL1-DLn may be formed on a same film. However, the sensing signal lines S1-Sn and the scan lines SL1-SLn may belong to different films. Additionally, the sensing signal lines S1-Sn and the data lines DL1-DLn may also belong to different films. In accordance with conductivity considerations, the sensing signal lines S1-Sn are typically composed of metallic materials and/or alloy materials. However, the invention is not limited thereto. According to other embodiments of the invention, the sensing signal lines S1-Sn may also be composed of other conductive materials, for example metal oxide, metal nitride, metal oxy-nitride, conductive polymer, other suitable materials, or combinations thereof.

In particular, each of the sensing signal lines S1-Sn, the data line DL1-DLn neighboring said sensing signal lines S1-Sn, and the corresponding scan lines SL1-SLn define a plurality of regions R each having at least one first sub-region R1 and at least one second sub-region R2. More specifically, each of the first sub-regions R1 and each of the second sub-regions R2 are respectively defined by one of the sensing signal lines S1-Sn, one neighboring data line (one of DL1-DLn), and two of the neighboring scan lines SL1-SLn. Using FIG. 1 as an example, one of the first sub-regions R1 is a region confined by the sensing signal line S1, the data line DL1, and the scan lines SL1 and SL2. Moreover, one of the second sub-regions R2 is a region confined by the sensing signal line S1, the data line DL1, and the scan lines SL2 and SL3. Another one of the second sub-regions R2 is a region confined by the sensing signal line S1, the data line DL1, and the scan lines SL3 and SL4. Since sensing devices are disposed in the regions R, the regions R can also be referred to as sensing device regions. It should be noted that, in the embodiment depicted in FIG. 1, each of the regions R is formed by a first sub-region R1 and two second sub-regions R2. However, embodiments of the invention place no restrictions on the number of the first sub-regions R1 and the second sub-regions R2 of each of the regions R. For example, each of the regions R may be formed by one first sub-region R1 and three or more second sub-regions R2.

The sensing-signal readout device T2 is disposed in the first sub-region R1 of each of the regions R. Moreover, the sensing-signal readout device T2 is electrically connected to one of the scan lines SL1-SLn and one of the sensing signal lines S1-Sn. The sensing-signal readout device T2 is, for example, a bottom-gate TFT including a gate, a semiconductor layer, a source, and a drain. The gate is electrically connected to one of the scan lines SL1-SLn. The semiconductor layer is disposed above the gate, and the source and the drain are disposed above the semiconductor layer. Moreover, the drain is electrically connected to one of the sensing signal lines S1-Sn. According to another embodiment of the invention, the sensing-signal readout devices T2 is a top-gate TFT including a gate, a semiconductor layer, a source, and a drain. The gate is electrically connected to one of the scan lines SL1-SLn. The semiconductor layer is disposed below the gate, and the source and the drain are disposed on two sides of the semiconductor layer. Moreover, the drain is electrically connected to one of the sensing signal lines S1-Sn. In view of the foregoing, the scan lines SL1-SLn not only serves as the signal lines of the controlling structures C disposed in the sub-pixel regions P, but the scan lines SL1-SLn also serve as the signal lines of the sensing-signal readout devices T2 disposed in the regions R (e.g., the first sub-regions R1).

The first sensing pads 102a are disposed in the second sub-regions R2 of the regions R and electrically connected to the sensing-signal readout devices T2 disposed in the first sub-regions R1. According to the present embodiment, each of the first sensing pads 102a is disposed in one of the second sub-regions R2. Each of the first sensing pads 102a is formed by a stacking pad and a conductive layer covering the stacking pad. In each of the regions R, all of the first sensing pads 102a in the second sub-regions R2 are electrically connected to each other via the conductive layers on the stacking pads thereof. Moreover, the conductive layers electrically connect the first sensing pads 102a to the sensing-signal readout devices T2.

It should be noted that, the devices in one of the regions R and the devices in the sub-pixel regions P disposed corresponding to the region R form a pixel structure set U. Referring to the embodiment depicted in FIG. 1, a pixel structure set U is formed by three control structures C (e.g., three sub-pixel regions P), one sensing-signal readout device T2 (e.g., one first sub-region R1), and two first sensing pads 102a (e.g., two second sub-regions R2). However, embodiments of the invention place no restrictions on the numbers of the controlling structures C (e.g., the sub-pixel regions P), the sensing-signal readout devices T2 (e.g., the first sub-regions R1), and the first sensing pads 102a (e.g., the second sub-regions R2) in each of the pixel structure sets U.

In particular, the sensing-signal readout devices T2 in the two pixel structure sets U arranged along an extended direction of the scan lines SL1-SLN are respectively electrically connected to the scan lines SL1 and SL2. In other words, two neighboring sensing-signal readout devices T2 arranged along the extended direction of the scan lines SL1-SLN are electrically connected to two different scan lines SL1-SLn, so that the numbers of sensing-signal readout devices T2 electrically connected to the respective scan lines SL1-SLn are the same. Therefore, in view of the entire pixel array, the sensing-signal readout devices T2 are not electrically connected to some of the scan lines in concentration, but electrical connected to each of the scan lines SL1-SLn in a distributed manner.

According to another embodiment of the invention, the pixel array further includes a plurality of dummy signal lines M1-Mn. The dummy signal lines M1-Mn are disposed parallel with the sensing signal lines S1-Sn. In other words, the dummy signal lines M1-Mn are substantially disposed parallel with the sensing signal lines S1-Sn and the data lines DL1-DLn and crossing the scan lines SL1-SLn. More specifically, an extended direction of the dummy signal lines M1-Mn is substantially parallel with an extended direction of the sensing signal lines S1-Sn and the data lines DL1-DLn, but not parallel with an extended direction of the scan lines SL1-SLn. More preferably, the extended direction of the dummy signal lines M1-Mn, is substantially parallel with the extended direction of the sensing signal lines S1-Sn and the data lines DL1-DLn, but is substantially perpendicular to the extended direction of the scan lines SL1-SLn. Moreover, the dummy signal lines M1-Mn, the sensing signal lines S1-Sn, and the data lines DL1-DLn may be formed on a same film. It should be appreciated that the dummy signal lines M1-Mn and the scan lines SL1-SLn may belong to different films. Additionally, the dummy signal lines M1-Mn, the sensing signal lines S1-Sn, and the data lines DL1-DLn may also belong to different films. In accordance with conductivity considerations, the dummy signal lines M1-Mn are typically composed of metallic materials or alloy materials. However, the invention is not limited thereto. According to other embodiments of the invention, the dummy signal lines M1-Mn may also be composed of other conductive materials, for example metal oxide, metal nitride, metal oxy-nitride, conductive polymer, other suitable materials, or combinations thereof.

In particular, one of the dummy signal lines M1-Mn, one neighboring data line DL1-DLn, and the corresponding scan lines SL1-SLn define a plurality of photo spacer configuration regions 104a. Referring to the embodiment depicted in FIG. 1 as an example, each of the photo spacer configuration regions 104a is a region confined by one of the dummy signal lines M1-Mn (e.g., M1), one of the data lines DL1-DLn (e.g., DL2), and two neighboring scan lines SL1-SLn (e.g., SL1 and SL2). The photo spacer configuration regions 104a are used for the disposition of photo spacers therein. In other words, when the pixel array is applied in a display panel, photo spacers configured to support the cell gaps of the display panel may be disposed in the photo spacer configuration regions 104a. Besides the photo spacer configuration regions 104a, photo spacer configuration regions 104b may be disposed between two regions R (e.g., two pixel structure sets U) arranged along the extended direction of the data lines DL1-DLn. However, embodiments of the invention are not limited to disposing the photo spacers in the photo spacer configuration regions 104a or 104b. In practice, the photo spacers may be disposed in at least one location of a light shielding region of the pixel array (e.g., with scan lines, data lines, active devices, or other signal lines and devices disposed thereon). However, in alternative embodiments of the invention, dummy signal lines M1-Mn are omitted in the pixel array. The location of the photo spacers is referred to as the photo spacer configuration regions 104a, and the location may be in at least one location of a light shielding region of the pixel array (e.g., with scan lines, data lines, active devices, or other signal lines and devices disposed thereon).

Figure 2:
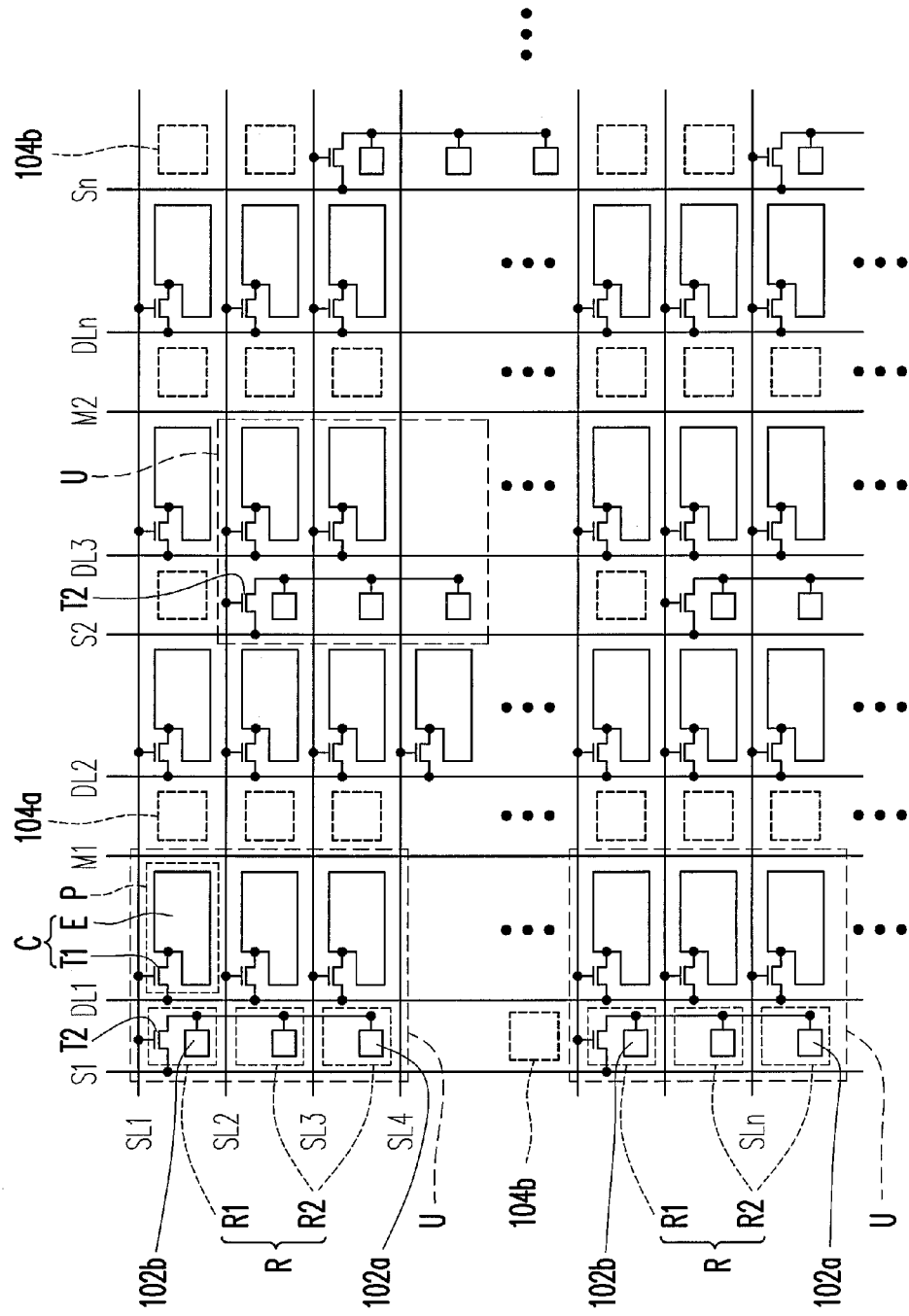
FIG. 2 is a schematic top view of a pixel array according to another embodiment of the invention.

FIG. 2 is a schematic top view of a pixel array according to another embodiment of the invention. The embodiment depicted in FIG. 2 is similar to the embodiment depicted in FIG. 1, therefore same components are denoted with the same numerals and not repeatedly explained hereafter. A difference between the embodiments of FIG. 2 and FIG. 1 is that the pixel array depicted in FIG. 2 further includes at least one second sensing pad 102b disposed in the first sub-region R1 of each of the regions R. Moreover, in each of the regions R, the second sensing pads 102b are electrically connected to the sensing-signal readout devices T2 and the first sensing pads 102a in series. Similarly, each of the second sensing pads is formed, for example, by a stacking pad and a conductive layer covering the stacking pad. In each of the regions R, the second sensing pads 102b are electrically connected to the first sensing pads 102a in series via the conductive layers on the stacking pads of the second sensing pads 102b. Moreover, the conductive layers electrically connect the second sensing pads 102b and the first sensing pads 102a to the sensing-signal readout devices T2.

Similarly, a plurality of dummy signal lines M1-Mn may be optionally disposed in the pixel array according to the embodiment depicted in FIG. 2. The corresponding explanation can be found in the foregoing description of the embodiment depicted in FIG. 1, and thus further explanation thereof is omitted hereafter.

Figure 3:
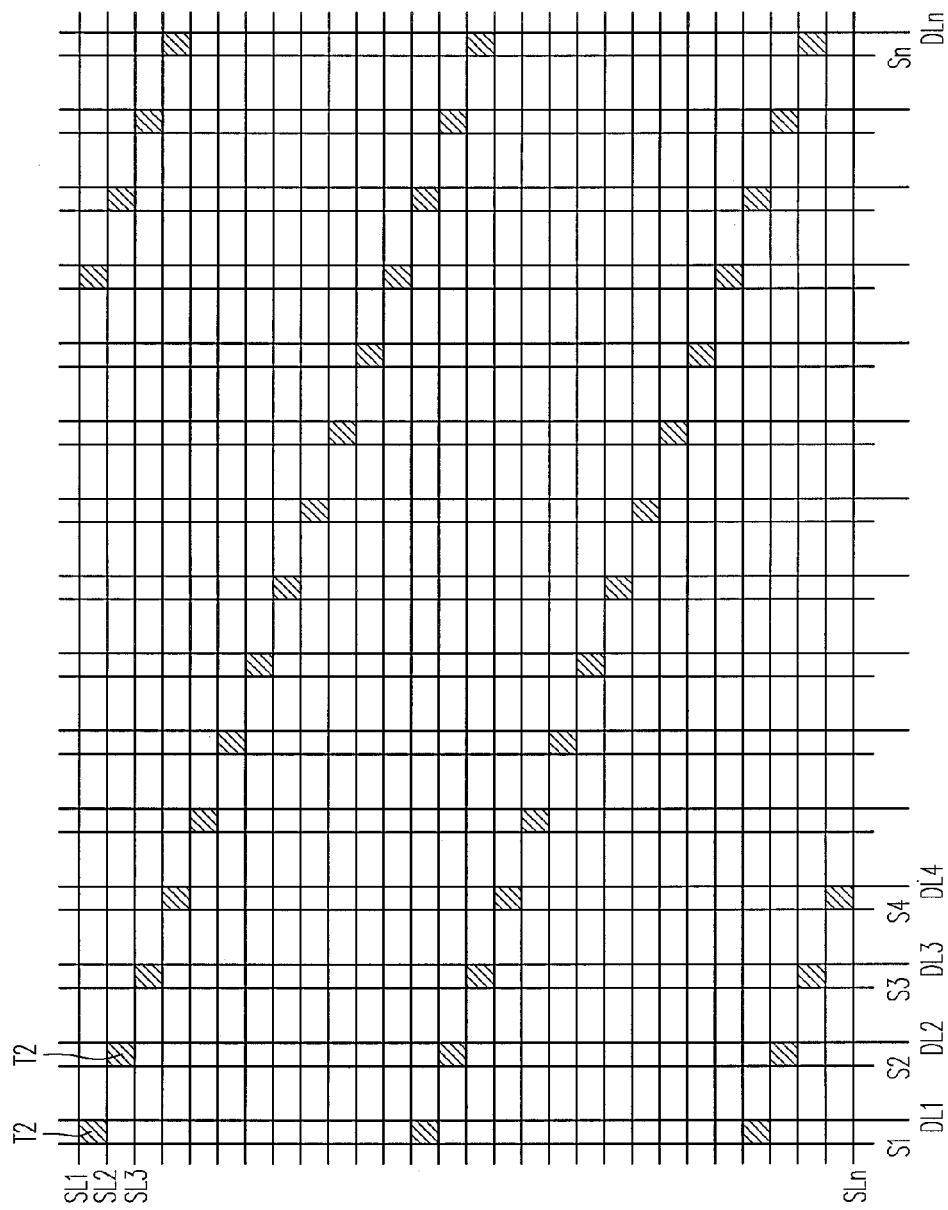
FIG. 3 is a schematic layout diagram of the sensing-signal readout devices in a pixel array according to an embodiment of the invention.

In the embodiments depicted in FIGS. 1 and 2, the numbers of the sensing-signal readout devices T2 electrically connected to the respective scan lines SL1-SLn are the same. Moreover, the sensing-signal readout devices T2 in the two pixel structure sets U arranged along an extended direction of the scan lines SL1-SLN are electrically connected to different scan lines SL1-SLn. Accordingly, a layout diagram of the sensing-signal readout devices T2 in the pixel array may be as shown in FIG. 3. In other words, the layout of the sensing-signal readout devices T2 in the pixel array may have a slanting arrangement (or namely obliquely arrangement). The sensing-signal readout devices T2 are not electrically connected to some of the scan lines in concentration, but electrical connected to each of the scan lines SL1-SLn in a distributed manner. Consequently, the loadings of the scan lines SL1-SLn in the pixel array are the same, thereby preventing the issue of overloading on a portion of the scan lines.

It should be noted that, in the present embodiment, the sensing-signal readout devices T2 in the two neighboring pixel structure sets U arranged along the extended direction of the scan lines SL1-SLn are electrically connected to two neighboring scan lines (e.g., scan lines SL1 and SL2). Nevertheless, the invention should not be construed as limited thereto. In other embodiments of the invention, the sensing-signal readout devices T2 in the two neighboring pixel structure sets U arranged along the extended direction of the scan lines SL1-SLn may be electrically connected to any two of the scan lines SL1-SLn.

Figure 4:
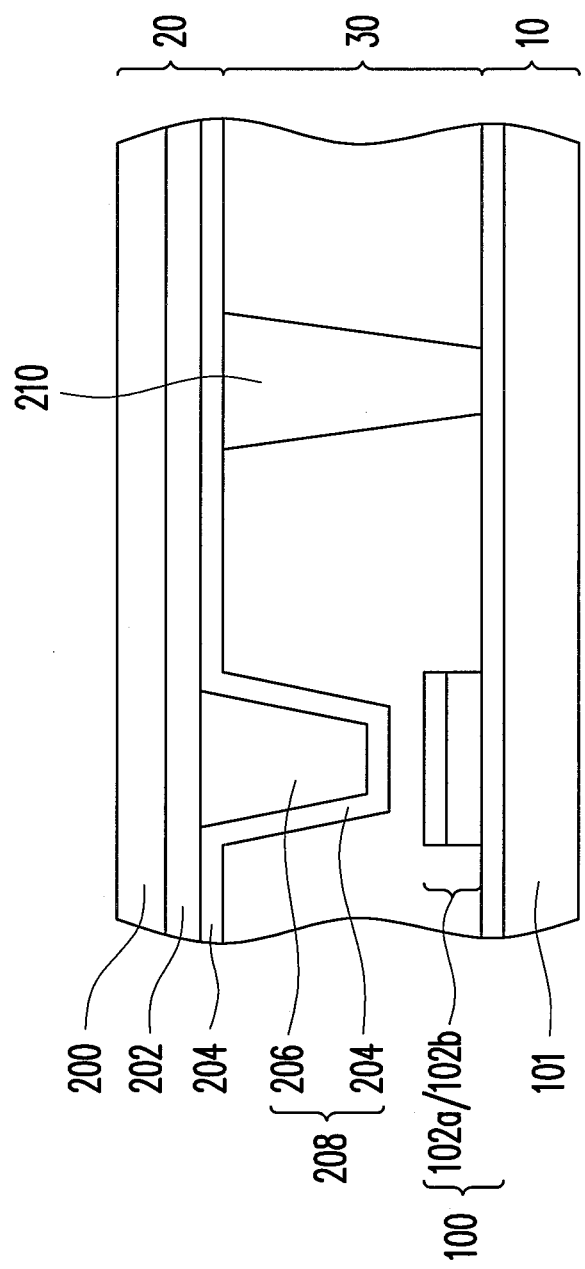
FIG. 4 is a schematic view of a display panel according to an embodiment of the invention.

FIG. 4 is a schematic view of a display panel according to an embodiment of the invention. Referring to FIG. 4, the display panel according to the present embodiment includes a first substrate 10, a second substrate 20 disposed opposite to the first substrate 10, and a display medium 30 disposed between the first substrate 10 and the second substrate 20.

The first substrate 10 includes a base 101 (i.e., also referred to as the first base) and a pixel array 100. A material of the base 101 may include glass, quartz, organic polymers, opaque materials (e.g., wafer, metal, ceramic), or other suitable materials. The base 101 is primarily used to carry the pixel array 100. Moreover, the pixel array 100 may be the pixel array depicted in FIG. 1 or FIG. 2, for example. The first sensing pads 102a and 102b in the pixel array 100 has a predetermined height.

The second substrate 20 includes a base 200 (i.e., also referred to as the second base), a color filter array 202, and an electrode layer 204. A material of the base 200 may include glass, quartz, or organic polymers, or other suitable materials. The electrode layer 204 is a transparent conductive layer composed of metal oxides such as indium tin oxide (ITO) or indium zinc oxide (IZO). The electrode layer 204 completely covers the second substrate 20. The color filter array 202 includes red, green, and blue filter patterns, for example. Moreover, the color filter array 202 may further include light shielding patterns (not drawn) also referred to as a black matrix, disposed between the red, green, and blue filter patterns. According to another embodiment of the invention, the second substrate 20 only includes the base 200 and the color filter array 202, or only includes the base 200 and the electrode layer 204. According to yet another embodiment, the second substrate 20 may only include the base 200. It should be noted that, when the second substrate 20 only includes the base 200 and the electrode layer 204, the color filter array 202 is disposed on the first substrate 10, that is, on the substrate 101. Moreover, the color filter array 202 may be optionally disposed above the active devices T1 of the controlling structures C in the pixel array 100, which can be referred to as color filter on array (COA). Alternatively, the color filter array 202 may be disposed below the active devices T1 of the controlling structures C in the pixel array 100, which can be referred to as array on color filter (AOC). Accordingly, the color filter array 202 is not disposed on the second substrate 20. In other alternative embodiments of invention, the black matrix (not drawn) and the color filter array 202 are disposed on the first substrate 10, that is, on the base 101. Moreover, the black matrix (not drawn) and the color filter array 202 are optionally disposed above the active devices T1 of the controlling structures C in the pixel array 100, which can be referred to as black matrix on array (BOA). Accordingly, the color filter array 202 and the black matrix (not drawn) are not disposed on the second substrate 20.

In particular, the second substrate 20 further includes photo spacers 210 and touch structures 208. The photo spacers 210 are disposed between the first substrate 10 and the second substrate 20, so as to support a cell gap spacing between the first and second substrates 10 and 20. Moreover, the photo spacers 210 are configured to support the cell gaps of the display panel, and the touch structures 208 are configured to detect a press location of a user. Therefore, the photo spacers 210 and the touch structures are not formed at the same time. More specifically, the photo spacers 210 are disposed in the corresponding photo spacer configuration regions 104a and/or 104b depicted in FIG. 1 or FIG. 2, although embodiments of the invention are not limited thereto. Furthermore, the touch structures 208 may be formed by the sensing photo spacers 206 and the electrode layer 204 covering the sensing photo spacers 206. The touch structures 208 is disposed corresponding to the sensing pads 102a and 102b of the first substrate 10. Moreover, a sensing gap (not drawn) is maintained between the touch structures 208 and the sensing pads 102a and 102b. When the user has not pressed the second substrate 20, the sensing gap (not drawn) does not change. When the user presses the second substrate 20, the sensing gap (not drawn) is modified, in which the sensing gap may be eliminated. That is, the touch structures 208 are directly contacting the sensing pads 102a and 102b.

The display medium 30 may include liquid crystal molecules or an electrophoretic display medium, for example a twisted nematic liquid crystal medium, a cholesteric liquid crystal display medium, a capsule electrophoretic display medium, a micellar electrophoretic display medium, or other suitable display mediums.

In the pixel array of the display panel according to the present embodiment, the numbers of the sensing-signal readout devices electrically connected to the respective scan lines are the same. Moreover, the sensing-signal readout devices in the two pixel structure sets arranged along an extended direction of the scan lines are electrically connected to different scan lines. Consequently, the loadings of the scan lines in the pixel array are the same, thereby preventing the issue of overloading on portion of the scan lines. Hence, the display panel employing the pixel array has a preferred display quality.

Although the invention has been described with reference to the above embodiments, it will be apparent to one of ordinary skill in the art that modifications to the described embodiment may be made without departing from the spirit of the invention. Accordingly, the scope of the invention will be defined by the attached claims not by the above detailed descriptions.

What is claimed is:

1. A pixel array, comprising:
a plurality of scan lines and a plurality of data lines disposed crossing the scan lines to define a plurality of sub-pixel regions;
at least one controlling structure disposed in one of the sub-pixel regions and electrically connected to one of the data lines and one of the scan lines;
a plurality of sensing signal lines disposed parallel with the data lines and crossing the scan lines, wherein each of the sensing signal lines, one neighboring data line of the plurality of data lines, and the corresponding at least two scan lines of the plurality of scan lines define one of a plurality of regions each having at least one first sub-region and at least one second sub-region, a first region of the plurality of regions is disposed in a first column, a second region of the plurality of regions is disposed in a second column, a third region of the plurality of regions is disposed in a third column, and the sensing signal lines and the data lines are physically different lines;
at least one sensing-signal readout device of a plurality of sensing-signal readout devices disposed in the at least one first sub-region, wherein the at least one sensing-signal readout device is electrically connected to one of the scan lines and one of the sensing signal lines, wherein the sensing-signal readout devices disposed in the first column, the second column and the third column are not aligned in the same row with each other, wherein the first column is adjacent to the second column, and the third column is adjacent to the second column; and at least one first sensing pad disposed in the at least one second sub-region and electrically connected to the at least one sensing-signal readout device in the at least one first sub-region.

2. The pixel array of claim 1, further comprising at least one second sensing pad disposed in the at least one first sub-region and electrically connected to the at least one sensing-signal readout device and the first sensing pad in series.

3. The pixel array of claim 1, wherein two neighboring sensing-signal readout devices of the plurality of sensing-signal readout devices arranged along an extended direction of the scan lines are electrically connected to different scan lines.

4. The pixel array of claim 1, further comprising a plurality of dummy signal lines disposed parallel with the sensing signal lines, wherein the dummy signal lines, the neighboring data line, and the corresponding scan lines define a plurality of photo spacer configuration regions.

5. The pixel array of claim 1, further comprising a plurality of photo spacer configuration regions are disposed between two regions of the plurality of regions arranged along an extended direction of the data lines.

6. A display panel, comprising:
a first substrate having the pixel array of claim 1;
a second substrate disposed opposite to the first substrate; and
a display medium disposed between the first substrate and the second substrate.

7. The pixel array of claim 1, wherein a number of the plurality of sensing-signal readout devices electrically connected to each of the plurality of scan lines is the same.

8. A pixel array comprising a plurality of pixel structure sets, each of the pixel structure sets comprising:
a plurality of scan lines and a data line disposed crossing the scan lines to define a plurality of sub-pixel regions;
at least one controlling structure disposed in one of the sub-pixel regions and electrically connected to the data line and one of the scan lines;
a sensing signal line disposed parallel with the data line and crossing the scan lines, wherein the sensing signal line, the data line, and the scan lines define a first sub-region and a plurality of second sub-regions;
at least one sensing-signal readout device of a plurality of sensing-signal readout devices disposed in the first sub-region, wherein the at least one sensing-signal readout device is electrically connected to one of the scan lines and the sensing signal line; and
at least one first sensing pad disposed in the second sub-region and electrically connected to the at least one sensing-signal readout device in the first sub-region,
wherein the plurality of sensing-signal readout devices in three pixel structure sets of the plurality of pixel structure sets arranged along an extended direction of the scan lines are electrically connected to different scan lines, and the sensing signal line and the data line are physically different lines,
wherein none of the sensing-signal readout devices in three pixel structure sets of the plurality of pixel structure sets arranged in different, adjacent columns are aligned in the same row.

9. The pixel array of claim 8, wherein a number of the plurality of sensing-signal readout devices electrically connected to each of the plurality of scan lines is the same.

10. The pixel array of claim 8, further comprising at least one second sensing pad disposed in the first sub-region and electrically connected to the at least one sensing-signal readout device and the first sensing pads in series.

11. The pixel array of claim 8, wherein each of the plurality of pixel structure sets further comprises a dummy signal line disposed parallel with the sensing signal line, wherein the dummy signal line, the data line, and the scan lines define a plurality of photo spacer configuration regions.

12. The pixel array of claim 8, further comprising a plurality of photo spacer configuration regions are disposed between two pixel structure sets of the plurality of pixel structure sets arranged along an extended direction of the data lines.

13. A display panel, comprising:
a first substrate having the pixel array of claim 8;
a second substrate disposed opposite to the first substrate; and
a display medium disposed between the first substrate and the second substrate.

14. A pixel array, comprising:
a plurality of sub-pixel region sets at least comprising a first sub-pixel region set and a second sub-pixel region set, each of the plurality of sub-pixel region sets at least comprising a first sub-pixel region, a second sub-pixel region, and a third sub-pixel region, wherein the first, second, and third sub-pixel regions of the first sub-pixel region set are arranged in a first column, and the first, second, and third sub-pixel regions of the second sub-pixel region set are arranged in a second column;
a plurality of region unit sets at least comprising a first region unit set, a second region unit set and a third region unit set, each of the plurality of region unit sets comprising at least one first region unit and at least one second region unit, wherein the at least one first region unit and the at least one second region unit of the first region unit set are arranged in a third column, the at least one first region unit and the at least one second region unit of the second region unit set are arranged in a fourth column, and the at least one first region unit and the at least one second region unit of the second region unit set are arranged in a fifth column;
at least one controlling device of a plurality of controlling devices disposed in at least one of the first, second, and third sub-pixel regions;
at least one readout device of a plurality of readout devices disposed in each of the at least one first region unit of each of the plurality of region unit sets;
at least one first sensing pad disposed in each of the at least one second region unit of each of the plurality of region unit sets;
a plurality of scan lines, comprising at least a first scan line, a second scan line, and a third scan line;
a plurality of data lines, comprising at least a first data line, a second data line, and a third data line; and
a plurality of sensing signal lines, comprising at least a first sensing signal line and a second sensing signal line, wherein the plurality of sensing signal lines and the plurality of data lines are physically different lines, wherein the plurality of controlling devices in the first, second, and third sub-pixel regions of the first sub-pixel region set are connected to the first data line, but the plurality of controlling devices in the first, second, and third sub-pixel regions are connected to the first, second, and third scan lines respectively, the plurality of controlling devices in the first, second, and third sub-pixel regions of the second sub-pixel region set are connected to the second data line, but the plurality of controlling devices in the first, second, and third sub-pixel regions are connected to the first, second, and third scan lines respectively;

wherein the at least one readout device of the first region unit set disposed in the third column, the fourth column and the fifth column are not aligned in the same row with each other, wherein the third column is adjacent to the fourth column, and the fourth column is adjacent to the fifth column, wherein the at least one readout device in the first region unit of the first region unit set is connected to the first scan line and the first sensing signal line, and the at least one readout device in the first region unit of the second region unit set is connected to the second scan line and the second sensing signal line, wherein the at least one first sensing pad in the second region unit of the first region unit set is connected to the at least one readout device in the first region unit of the first region unit set, and the at least one first sensing pad in the second region unit of the second region unit set is connected to the at least one readout device in the first region unit of the second region unit set.

15. The pixel array of claim 14, wherein the plurality of readout devices in the different first region units, are disposed in different columns and rows.

16. The pixel array of claim 14, further comprising at least one second sensing pad disposed in the first sub-region and electrically connected to the at least one readout device and the at least one first sensing pad in series.

17. The pixel array of claim 14, further comprising a plurality of dummy signal lines disposed parallel with the plurality of sensing signal lines, wherein the plurality of dummy signal lines, the neighboring data line, and the corresponding scan lines define a plurality of photo spacer configuration regions.

18. The pixel array of claim 14, further comprising a plurality of photo spacer configuration regions are disposed between the first region unit set and the second region unit set.

19. The pixel array of claim 14, wherein the at least one controlling device is not connected to the plurality of sensing signal lines.

20. The pixel array of claim 14, wherein the at least one readout device is not connected to the plurality of data lines.

21. A display panel, comprising:
 a first substrate having the pixel array of claim 14;
 a second substrate disposed opposite to the first substrate; and
 a display medium disposed between the first substrate and the second substrate.

* * * * *